United States Patent Office 2,842,890
Patented July 15, 1958

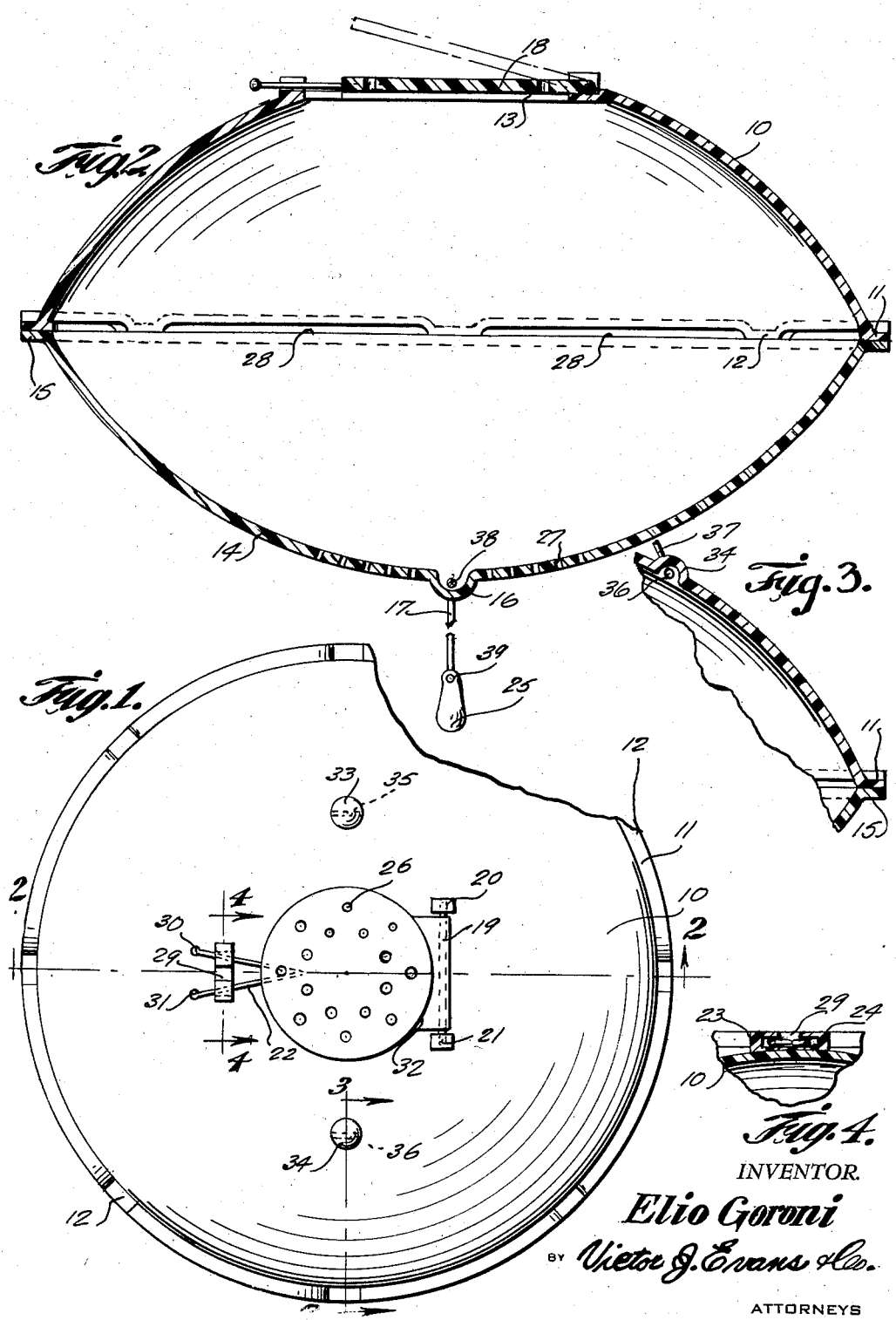

2,842,890
LIVEBAIT CONTAINER
Elio Goroni, Allen Park, Mich.

Application May 31, 1956, Serial No. 588,514

5 Claims. (Cl. 43—55)

This invention relates to fishing tackle, and in particular a bulb-like casing of heat formed clear plastic with water circulating openings therethrough and with a door on the upper end whereby with the device suspended in the water live bait, such as minnows, chubs, frogs, and the like are provided with a continuous supply of fresh water and the bait are within view of fish in the water providing attracting means.

The purpose of this invention is to provide a live bait container that provides a lure for attracting fish and which, being positioned in the water, provides a continuous fresh water supply for the bait.

Various types of minnow buckets and other devices have been provided for transporting and retaining live bait and although numerous devices have been provided for injecting air into water in live bait containers comparatively large quantities of bait are lost annually by suffocation in conventional containers. With this thought in mind this invention contemplates a live bait container that is readily suspended in the water at the side of a boat, dock, or the like and in which the device is readily elevated for selecting a bait.

The object of this invention is, therfore, to provide a live bait container that is adapted to be suspended in the water so that bait therein are supplied with fresh water continuously.

Another object of the invention is to provide a live bait container which, being of transparent material, provides a lure for fish in the surrounding area.

A further object of the invention is to provide a transparent live bait container that is adapted to be immersed in the water in which the container is of a simple and economical construction.

With these and other objects and advantages in view the invention embodies a container having upper and lower sections having arcuate upper and lower walls with water circulating openings in the lower wall, a door positioned to cover an opening in the upper wall and with means for connecting the sections whereby the device is adapted to be dropped into water as a unit with live bait in the interior thereof.

Other features and advantages of the invention will appear from the following description taken in connection with the drawing, wherein:

Figure 1 is a plan view of the improved live bait container.

Figure 2 is a cross section through the container taken on line 2—2 of Fig. 1 showing a cover or door in the closed position in full lines and in a partly open position in dotted lines.

Figure 3 is a section through a portion at one side of the container taken on line 3—3 of Fig. 1 showing a line attaching eye in the wall of the container.

Figure 4 is a section taken on line 4—4 of Fig. 1 showing latching means for rotating the cover or door in the closed position.

Referring now to the drawing wherein like reference character denote corresponding parts the improved live bait container of this invention includes an upper substantially semi-spherical section 10 having a continuous flange 11 with downwardly offset sections 12 on the lower edge and a circular opening 13 in the upper portion, a lower substantially semi-spherical section 14 having a continuous flange 15 positioned to receive the lugs 12 of the upper section 10 and having an eye 16 for a weight attaching fasteners 17 in the lower part, a door 18 pivotally mounted by a pin 19 in bearings 20 and 21 and held by a spring latch 22 slidably mounted in clips 23 and 24 on the upper section 10, and a weight 25 suspended by the fastener 17 from the eye or projection 16 in the center of the lower section 14.

The door 18 is provided with perforations or openings 26 and with similar openings 27 in the central portion of the lower section 14 and also with openings 28 between the lugs 12 separating the upper and lower sections circulation of water is provided through the container.

The spring arms 22, which provided the locking means of the door, are imbedded in the material of the door and the clips 23 and 24, which are positioned with a gap 29 between inner edges thereof are mounted on the surface of the upper section 10, whereby with the spring arms 22 squeezed together by gripping knobs 30 and 31 on extended ends thereof the arms are adapted to pass through the gap 29 to release the door and also to secure the door in the closed position. The opposite side of the door is provided with a hub 32 through which the pin 19 extends, as shown in Fig. 1.

The upper section 10 of the container is also provided with arcuate knobs or eyes 33 and 34 through which slots 35 and 36 extend and a fishing line, or a bale 37 may be extended through the slots to provide supporting means for the container.

The projection 16 which is similar to the eyes or projections 33 and 34 and which is positioned at a low point of the lower section 14 is provided with a slot or opening 38 through which the link or fastener 17, for supporting a weight 25 is positioned. The lower end of the fastener 17 extends through an opening 39 in the upper end of the weight.

With the parts formed of heat formed clear plastic material and with the offset sections 12 of the flange 11 of the upper section 10 secured to the flange 15 of the lower section 14 by acid or a suitable adhesive or other fastening means, live bait such as minnows, chubs, frogs, and the like are placed inside of the container, through the door 18 and with the door closed and the container suspended by a bale, wire, or fishing line through the eyes 33 and 34 the device is lowered into the water whereby the bait are provided with a continuous supply of fresh water and wherein fish in the surrounding area will be attracted by the bait, and with similar bait on a fishing line in the vicinity of the container fish, attracted by the bait in the container will take the bait on the line.

Although the body of the live bait container is shown as being formed with upper and lower sections it may be formed in one piece by molding processes, such as injection molding, and the door mounted to provide a closure for the opening in the upper portion thereof.

It will be understood that modifications, within the scope of the appended claims, may be made in the design and arrangement of the parts without departing from the spirit of the invention.

What is claimed is:

1. A live bait container comprising a casing of transparent plastic material having a semi-spherical lower section with a continuous peripheral flange and a complementary upper section also with a continuous peripheral flange, the flange of the upper section having portions thereof offset downwardly at spaced intervals separating the body of the flange of the upper section from the flange of the lower section providing water circulating passages between the sections, said upper section having an opening in the upper end and attaching elements for supporting devices thereon, a door positioned to close the opening in the upper end of the container, and a latch for retaining the door in the closed position.

2. In a live bait container, a hollow body of transparent material having a semi-spherical lower section with a continuous peripheral flange and a complementary upper section also with a continuous peripheral flange, the flange of the upper section having portions thereof offset downwardly at spaced intervals separating the body of the flange of the upper section from the flange of the lower section providing water circulating openings therein and having an opening in the upper end, a door positioned to close the opening in the upper end of the body, and means for temporarily retaining the door in the closed position.

3. In a live bait container, a hollow body of transparent material having a semi-spherical lower section with a continuous peripheral flange and a complementary upper section also with a continuous peripheral flange, the flange of the upper section having portions thereof offset downwardly at spaced intervals separating the body of the flange of the upper section from the flange of the lower section providing water circulating openings therein and having an opening in the upper end, a door positioned to close the opening in the upper end of the body, and means for temporarily retaining the door in the closed position, said body having attaching elements for supporting devices thereon.

4. In a live bait container, the combination which comprises a hollow body including a substantially semi-spherical lower section having a continuous peripheral flange, a substantially semi-spherical upper section having a continuous flange with spacing lugs extended therefrom and positioned in meeting relation with the flange of the lower section, said upper section having an opening in the upper end, a door pivotally mounted on the upper section and positioned to close the opening, and a latch for retaining the door in the closed position.

5. In a live bait container, the combination which comprises a hollow body including a substantially semi-spherical lower section having a continuous peripheral flange, a substantially semi-spherical upper section having a continuous flange with spacing lugs extended therefrom and positioned in meeting relation with the flange of the lower section, said upper section having an opening in the upper end, a door pivotally mounted on the upper section and positioned to close the opening, a latch for retaining the door in the closed position, projections having openings therethrough positioned on the outer surfaces of the sections, and a weight secured by attaching means to a projection of the lower section, and said sections also having water circulating openings therethrough.

References Cited in the file of this patent

UNITED STATES PATENTS

| | | |
|---|---|---|
| 636,694 | Pflueger | Nov. 7, 1899 |
| 777,382 | Beau | Dec. 13, 1904 |
| 1,038,866 | Fuller et al. | Sept. 17, 1912 |